April 21, 1959  G. H. COTTER  2,883,306
ELECTRODE COATING PROCESS AND APPARATUS
Filed April 15, 1955  2 Sheets-Sheet 2
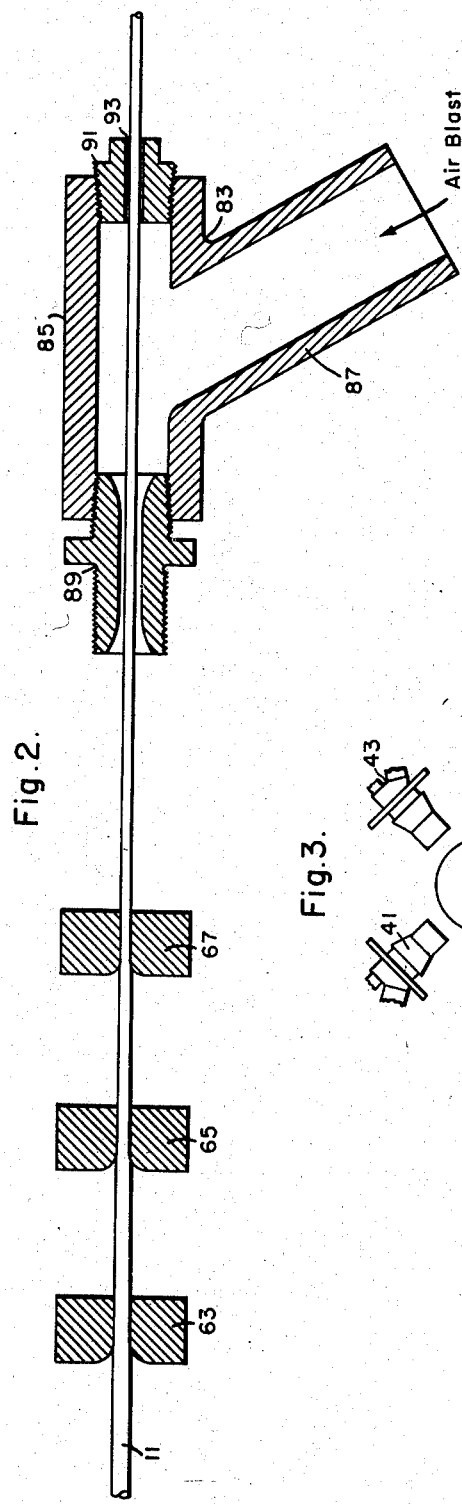
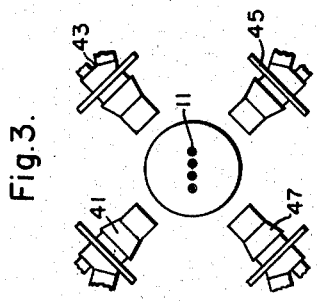
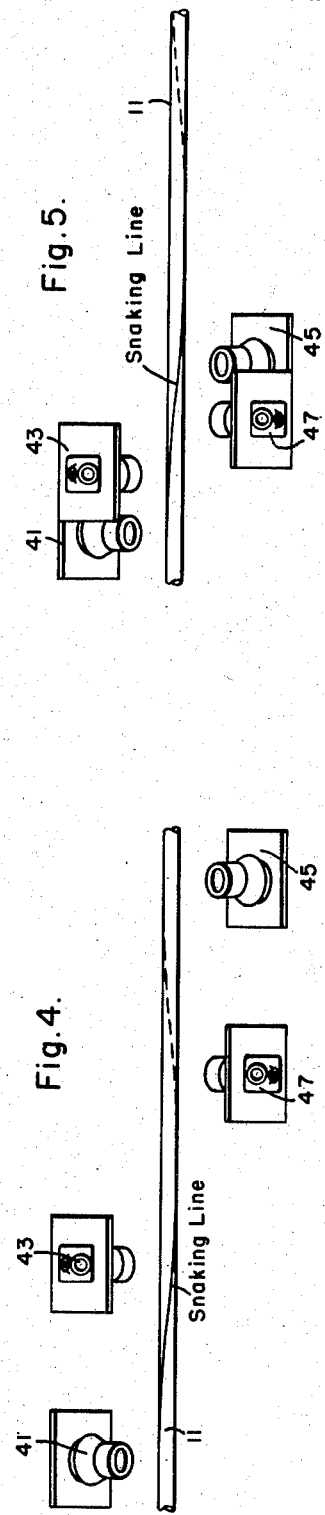

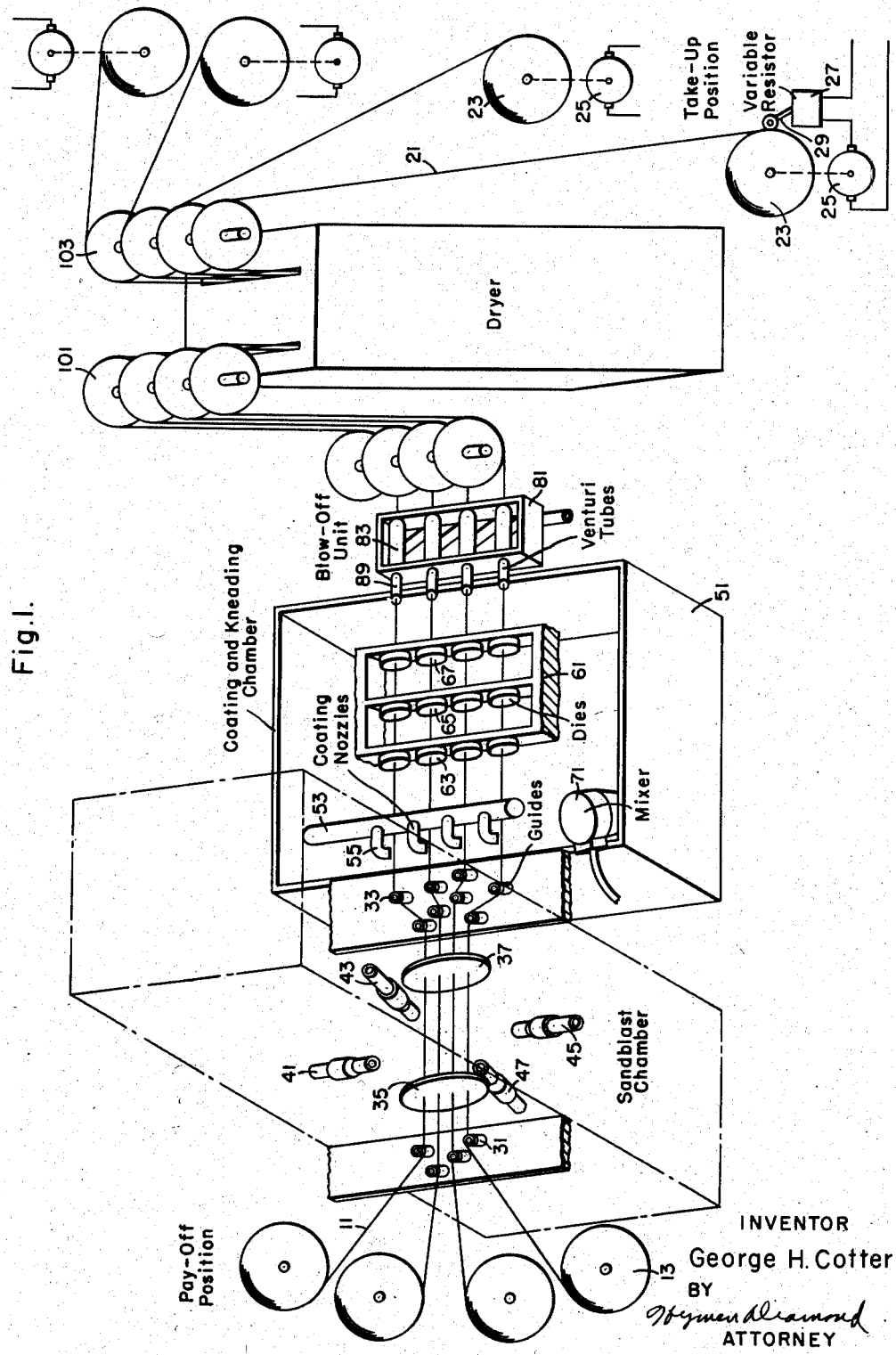

United States Patent Office 2,883,306
Patented Apr. 21, 1959

2,883,306

ELECTRODE COATING PROCESS AND APPARATUS

George H. Cotter, Springville, N.Y., assignor to Westinghouse Electric Corporation, East Pittsburgh, Pa., a corporation of Pennsylvania Application April 15, 1955, Serial No. 501,568

10 Claims. (Cl. 117—205)

This application relates to arc welding electrodes, and has particular relation to electrodes of the type used in consumable electrode arc welding in a shield or atmosphere of a gas, such as an inert gas or carbon dioxide. Specifically, this application relates to electrodes such as are disclosed in applications Serial Nos. 286,348, filed May 6, 1952, to Howard C. Ludwig; 324,473, filed December 6, 1952, to Howard C. Ludwig; 432,958, filed May 28, 1954, to Julius Heuschkel and Howard C. Ludwig; and 441,534, filed July 6, 1954, to Howard C. Ludwig, all assigned to Westinghouse Electric Corporation. The above-identified applications are incorporated in this application by reference.

In the above-identified applications, and particularly in applications Ser. Nos. 432,958 and 441,534, welding electrodes which are coming into wide use for the welding of mild steel are disclosed. Application Ser. No. 324,473 discloses facilities and a method for producing such electrodes. While highly satisfactory electrodes have been produced in moderate quantities in accordance with the teaching of application Ser. No. 324,473, the demand for the electrode disclosed in applications Ser. No. 432,958 and 441,534 has far exceeded the productive capabilities of this apparatus, and it has become desirable that the electrode be produced in very large quantities of the order of 5,000 pounds per day.

It is, accordingly, broadly an object of this invention to provide a method and apparatus for producing welding electrodes of the type disclosed in applications Ser. Nos. 324,473, 432,958 and 441,534 in large quantities.

The electrode disclosed in the above-listed applications comprises a core of a wire usually of steel, the surface of which is roughened and on which a very thin layer of oxygen containing material is deposited. In accordance with the invention in its specific aspects, apparatus and a method are provided for producing a welding electrode consisting of a core wire of mild steel having a fine roughening on its surface and having a coating consisting of a mixture having essentially the composition:

| | Percent |
|---|---|
| Calcium oxide | 15 |
| Manganese dioxide | 20 |
| Titanium dioxide | 65 | is produced. This coating is very thin, a satisfactory electrode having about .00336 gram of coating per lineal foot of electrode.

The invention in its broader aspects arises from the discovery that the quality of welds produced with the electrode is critically affected by the uniformities of the roughening and the coating and on the quantity of the coating material per unit length of electrode, which in itself is very small. The roughening and the coating must then be highly uniform and the quantity of coating per unit length must be within the range required to meet the demands which industry imposes on the quality of the welds to be produced with the electrode.

Further, because the wire is to be fed through tubular wire driving mechanisms and through the tubular channels of a welding gun, the coating must be intimately embedded into the pores or depressions in the surface. If it is not, the walls of the tubular channels through which the wire is fed will remove the coating and in addition difficulty will be encountered in making electrical contact to the wire. It is imperative then that the build-up of any excess material on any region of the surface be avoided and that the roughening must be so uniform that when the excess coating is removed the remaining coating is uniform. It is also necessary that excessive removal of coating during the processing of the electrode be avoided. The rigor of these demands is enhanced by the condition that the quantity of coating per unit length shall be small.

It is, accordingly, a specific object of this invention to provide apparatus and a method for uniformly roughening the surface of a core wire of an electrode of the type disclosed in the above-listed applications.

It is another specific object of this invention to provide apparatus and a method for depositing a uniform coating having a very small mass of the order of a small fraction of a milligram per unit length on a uniformly roughened wire.

A further specific object of this invention is to provide a method and apparatus for producing a welding electrode of the type disclosed in the above-listed applications which shall include provisions for removing effectively any excess coating from the surface of the electrode without removing the coating itself.

It has been discovered that the character of the coating facilitates the embedding of the coating material into the pores. To a large extent, the coating consists of oxides resembling pigments. During the coating process such oxides exist as hydrous oxides and hydrated hydroxides and these materials have good adhesive quality and need only be kneaded into the pores or indentations in the surface of the wire to insure a strong bonding between the wire surface and the coating. Under the circumstances, it is only necessary that the coating be deposited from a highly uniform emulsion or slip.

It is then a specific object of this invention to provide a coating emulsion or slip of high uniformity which shall readily lend itself to the provision of a highly uniformly coated welding electrode of the type disclosed in the above-listed applications.

Another specific object of this invention is to provide a method and apparatus for producing an electrode of the type disclosed in the above-listed applications in the practice and use of which the coating slip shall be kneaded intimately into the pore surface of the wire core so that it adheres firmly to the surface.

One aspect of our invention involves the roughening of the wire and the character of the apparatus with which the wire is roughened. The wire in its unprocessed form is supplied on reels or spools which can be called feed spools or reels. In being processed, a plurality of strands of wire are pulled from separate feed spools through the roughening equipment by the rotation of a plurality of take-up reels or spools which are motor-driven. The roughening is effected by pulling the strands of wire through a roughening chamber which includes a plurality of nozzles spaced longitudinally along the chamber and transversely about the wires. The wires are closely spaced. Because the wire is uncoiled from the feed spools on which it has a diameter varying from small to moderate magnitude, it tends to snake, that is, turn about its longitudinal axis in the sandblast chamber. It has been discovered in conceiving this invention that because of the snaking, the spacing of the sandblast nozzles is critical. The nozzles must be so spaced that the abrasve particles emitted by the different nozzles are projected on different portions of the surface of the wire so that the wire is roughened throughout.

Another feature of this invention in its specific aspects arises from the discovery of the properties which a coating emulsion or slip must have to produce the required coating. It has been found that the coating slip may be produced by mixing the oxides in the above-listed proportions in water. The oxides are of commercial technical grade and may be purchased in powdered form from Riverside Chemical Company of Tonawanda, New York, or any other supplier. In preparing the slip the oxides are first micro-pulverized and blended intimately and the powder thus produced is diffused into water at a low rate while the water is continually and vigorously agitated or stirred so that the particles take in water and become hydrated oxides and hydroxides and a slip or emulsion of some degree is produced. The slip has a specific gravity of about 1.40 to 1.75 and is highly alkaline. It has been found that the pH of the slip is of the order of 12.6.

A further feature of this invention in its specific aspects involves the kneading of the coating into the wire. This kneading is in accordance with the invention effected by passing the wire through dies of a hard material such as tungsten carbide. The diameter of the opening in the dies must necessarily be greater than the diameter of the wire, but sufficiently small to effectively knead the coating into the pores of the wire. It has been discovered in conceiving this invention that the openings in the tungsten carbide dies must take into consideration the tolerances subject to which the wire is produced. Usually the wire, as supplied, may vary from a mean diameter, which is specified to the supplier, by plus or minus .001 inch. It is essential that the die of the smallest diameter shall have an opening of a diameter greater by a few thousandths than the greatest diameter of the wire, taking into consideration the tolerance subject to which it is produced. Specifically, in accordance with the invention, the coating is impressed by passing each strand of wire in succession through three dies, the leading one having an opening diameter equal to the wire diameter plus .003 inch, the intermediate one having an opening diameter equal to the wire diameter plus .002 inch, and the last one having an opening diameter equal to the wire diameter plus .001 inch.

A still further feature of this invention in its specific aspects involves the facilities for removing the excess coating. It has been found in conceiving this invention that this object can not be accomplished by a wiping action because the wire rapidly cuts through any of the usual wiping materials, such as rubber, nylon, felt or steel. In accordance with the invention, the excess coating is removed by projecting a blast of air at a high speed along the coated electrode. This blast effectively removes any excess of coating.

The novel features considered characteristic of the invention are set forth generally above. The invention itself, both as to its organization and its method of operation, together with additional objects and advantages thereof, will be understood from the following description of a specific embodiment taken in connection with the accompanying drawings, in which:

Figure 1 is a diagrammatic view showing a roughening and coating line in accordance with the invention;

Fig. 2 is a view, partly in section and partly diagrammatic, showing the facilities in accordance with the invention, for comprising the coating into the wire and for removing the excess coating;

Fig. 3 is a diagrammatic view showing the transverse arrangement of the sandblast nozzles; and Figs. 4 and 5 are diagrammatic views showing the effect of snaking on the roughening operation.

The line shown in Fig. 1 includes a Pay-Off Position, a Sandblast Chamber, a Coating and Kneading Chamber, a Blow-Off Unit, a Dryer and a Take-Up Position. The unprocessed wire 11 is deposited at the pay-off position on feed spools 13 and the processed wire 21 is wound on take-up spools 23 at the Take-Up position. The wire 11 is pulled from the Pay-Off Position by the rotation of the take-up spools 23, each of which is driven by a motor 25. As the diameter of each of the take-up spools 23 varies, from the small initial diameter to the moderate final diameter, the speed of the motor 25 is varied by a variable resistor 27 in circuit with the motor. The resistor 27 has an adjustable tap or arm 29 which engages the electrode 21 on the take-up spool and is pivoted as the diameter of the take-up spool 23 varies. In being pulled from the feed spools 13 to the take-up spools 23, the wire or electrode may pass over a number of idling and deflecting rollers, only several of which are shown. The wire is tautened by a drag brake (not shown) on each pay-off arbor on which pay-off or feed spool is rotated.

The wire 11 is first passed through the Sandblast Chamber, passing over roller guides 31 and 33 rotatable in vertical planes in passing into and out of the Chamber and through guide plates 35 and 37 within the Chamber. An adjustable Drag Brake (not shown) on pay-off arbor has the effect of impressing reasonable friction drag on the wires, thus keeping them taut. The guides 35 and 37 within the Chamber have the effect of preventing the wire from whipping and are preferably composed of a wear-resistant material, such as a ceramic or tungsten carbide. The guides 31 and 33 are arranged to cause the wire to converge as it passes into the chamber and to diverge as it passes out of the chamber. The four wires 11 within the Chamber are spaced linearly, the distance between the centers of adjoint wires being preferably of the order of 9/16 of an inch.

The wires 11 are roughened by projecting an abrasive through a plurality of nozzles 41, 43, 45 and 47 against their surface. The abrasive is preferably of 100 mesh particles essentially of aluminum oxide which is sold by Exolon Company of Tonawanda, New York under the trade name "Fast-Blast." This material breaks up during the blasting process and gives a mixture between 280 mesh and 100 mesh. The smaller particles are separated out into the collector and disposed of as waste as it has been found that they do not produce effective roughening. The blast nozzles 41, 43, 45, 47 are spaced longitudinally and transversely to the wires 11. This spacing is such that the surface of the wires is uniformly blasted. Transversely the nozzles 41 through 47 are spaced on both sides of the plane defined by the wires 11, each nozzle being at an angle of 45° to this plane. Longitudinally they are so spaced that each projects the abrasive on a different portion of the surface of the wire 11 considering the snaking of the wire. This is illustrated in Figs. 4 and 5.

In each of these views, the snaking effect is represented by a spiral line around the wire. This line represents the changing position of a point on the wire 11 as the wire moves through the chamber snaking while it moves. In Fig. 4, the nozzles 41 through 47 are shown as spaced too great a distance for effective roughening. In this case, it is seen that the four nozzles would have a tendency to project the abrasive substantially on the same areas of the wire as it moves and snakes. In Fig. 5, the nozzles are shown longitudinally spaced in such a way that they roughen the wire uniformly. In this case, it is seen that the blast is directed by the nozzles 41 through 45 on different area portions of the wire. The proper spacing of the nozzles 41 through 47 must be worked out for each case on the basis of the snaking which exists. It is within the scope of this invention to solve the snaking problem by adjustment of both the horizontal and the vertical positions of the nozzles as well as either the horizontal or the vertical.

The Coating and Kneading Chamber includes a tank 51 having mounted therein a tube 53 from which a plurality of slip supply nozzles 55 project. The slip is pumped through the tube 53 and passes through the nozzles 55 onto the wire strands 11 which move just below the openings in the nozzles 55.

The Coating and Kneading Chamber also includes a die holder 61 in the form of a frame having a central wall. A plurality of sets of dies 63, 65, 67 equal in number to the number of strands 11 are mounted with their openings coaxial in the walls of the frame 61 so that the wire passes through these dies in succession. The openings 69 in the dies have diameters a few thousandths greater than the diameter of the wire considering the tolerances subject to which the wire is produced, the die 63 nearest the Pay-Off Position having the largest opening diameter and the die 67 nearest the Take-Up Position having the smallest. It is seen that as the wire 11 passes through the Coating and Kneading Chamber, they are first coated with the slip and then the coating is kneaded into the pores of the wires by the dies 63, 65, 67. The excess slip passing through the nozzle 55 is deposited in the base of the chamber. A mixer 71 projects into this excess slip and keeps it agitated. Samples of the slip are removed periodically so that its specific gravity can be checked.

The Blow-Off Unit includes a frame 81 in which a plurality of T joints 83 each having the cross-section approximately of the handle of a revolver are mounted. The cross tube 85 and the stem 87 of each joint have openings which communicate. The stem 87 is approximately at an angle of 135° to the portion of the cross tube 85 which is in the direction from which the wire 11 flows. A venturi tube 89 is screwed into the forward end of the cross tube 85 and a plug 91 is screwed into the rear end. The plug has an opening 93 having a diameter approximately 1/16 of an inch greater than the diameter of the wire 11. The opening in each of the stems 87 communicates with a compressed air supply (not shown); the compressed air is supplied at a regulated pressure of the order of 10 to 35 pounds. The wire 11 passes centrally through the venturi tube 89 through the cross tube 85 and through the plug 91. The regulated air projected through the stem 85 passes over the surface of the wire 11 at a very high speed, in fact, a speed such that the speed of the wire itself is negligible. The flow of air is laminar and the wire is uniformly blasted by the air so that any excess of coating material is readily removed and the coating remaining on the wire is highly uniform.

The Dryer may be of any well known type and is preferably electrically energized. Each of the strands of wire 11 passes into and out of the Dryer over a plurality of deflecting idlers 101 and 103. There are also a number of idlers (not shown) within the dryer which have the effect of maintaining the coated wire in the dryer a sufficiently long time to dry the coating effectively. The Dryer is preferably operated at a temperature of about 600° F. for wire speeds between 300 to 400 feet per minute. For higher speeds the temperature must be increased correspondingly.

In the practice of the invention, the wire is initially payed off the feed spools and attached to the back of the take-up spools. The blast nozzles 41 through 47 are then supplied with abrasive, the slip nozzles 55 with the slip, and the Blow-Off Unit with compressed air. The take-up motors 25 are then energized and cause the wire to move through the line. The wire is preferably moved at about 350 feet per minute.

The roughening of the surface of the wire should be very fine. Quantitively, the roughening should be such as to produce projections of a height of approximately 25 to 60 microinches R.M.S. This roughening can barely be seen with the naked eye; it gives the wire a fine matt appearance.

The slip will have the approximate specific gravity and the pH factor given above. The dies 63, 65, 67 should have the above given dimensions and the air blast through the blow-off unit should be as stated at between 10 and 35 pounds. The length of wire in the Dryer should be of the order of 28 feet. With this length of wire in the Dryer any element of the wire is dried somewhat less than 1/10 of a second.

The apparatus disclosed herein has been found to operate highly satisfactorily and to produce electrodes with which sound welds of high quality may be made. While the electrode is preferably used in welding in a shielding atmosphere at straight polarity, it may also be used and has been used successfully in welding at alternating-current and at reverse polarity.

While a specific embodiment of the invention has been disclosed herein, many modifications thereof are feasible. The invention, therefore, is not to be restricted except as is necessitated by the spirit of the prior art.

I claim as my invention:

1. The method of producing a coated consumable welding electrode particularly for welding in an atmosphere of shielding gas which comprises producing a fine roughening on the surface of a core wire, depositing a slip of coating material on said surface, passing the wire so coated through die means to compress said coating into the irregularities in the surface of the wire, removing the excess of coating from the surface of the wire, and drying the wire so coated at an elevated temperature, the said method being characterized by the fact that the excess of coating is removed by directing an air blast substantially parallel to the wire, and further characterized by die means including a plurality of dies having openings of decreasing area along the path of said wire, the die having the opening of smallest area having an opening just greater than the cross sectional area of said wire of largest area to be processed taking into consideration the tolerances subject to which the wire is produced.

2. The method of producing a coated consumable welding electrode particularly for welding in an atmosphere of shielding gas which comprises producing a fine roughening on the surface of a core wire, depositing a slip of coating material on said surface, said slip consisting essentially of an emulsion of the oxides of calcium, manganese, and titanium in water, said emulsion having a pH of the order of 12.6 at room temperature; passing the wire so coated through die means to compress said coating into the irregularities in the surface of the wire, removing the excess of coating from the surface of the wire by directing an airblast substantially parallel to said wire, and drying the wire so coated at an elevated temperature.

3. The method of producing a coated consumable welding electrode particularly for welding in an atmosphere of shielding gas which comprises producing a fine roughening on the surface of a core wire, depositing a slip of coating material on said surface, slip having a specific gravity of between about 1.40 and 1.75, passing the wire so coated through die means to compress said coating into the irregularities in the surface of the wire, removing the excess of coating from the surface of the wire by directing an airblast substantially parallel to said wire, and drying the wire so coated at an elevated temperature.

4. The method of producing a coated consumable welding electrode particularly for welding in an atmosphere of shielding gas which comprises passing a core wire continuously and in succession through surface roughening means to produce a fine roughening on the surface of said wire, coating depositing means to deposit a slip of coating material on said surface, die means to compress said coating into the irregularities in the surface of said wire, air blast means for directing an air blast substantially parallel to said wire for removing excess coating from the surface of said wire, and through drying means, the wire being passed through said drying means directly after passing through said air blast.

5. The method of producing a coated consumable welding electrode particularly for welding in an atmosphere of shielding gas which comprises passing a core wire continuously and in succession through surface roughening means to produce a fine roughening on the surface of said wire, coating depositing means to deposit a slip of coating material on said surface, die means to compress said coating into the irregularities in the surface of said wire, air blast means for directing an air blast substantially parallel to said wire for removing excess coating from the surface of said wire, the speed of said wire being at least about 350 feet per minute and said air blast having a speed so high that the speed of said wire is negligible compared to the speed of said air blast, and through drying means, said wire being passed through said drying means directly after being passed through said air blast.

6. Apparatus for producing a consumable electrode for welding in an atmosphere of a non-reactive shielding gas, said electrode consisting of a core wire having a thin coating of an arc stabilizing material thereon, the quantity of said coating being maintained within precise limits, the said apparatus comprising in combination a processing unit including wire roughening means, coating depositing means, coating kneading means and means for removing excess coating and means for advancing said wire through said unit, the said apparatus being characterized by excess coating removing means including means for directing an air blast substantially parallel to the roughened and coated wire into which the coating has been kneaded, said airblast directing means including a venturi tube having an elongated constricted opening therein and said advancing means moving said wire with its longitudinal axes substantially parallel to the wall of said opening.

7. Apparatus for producing a consumable electrode for welding in an atmosphere of a non-reactive shielding gas, said electrode consisting of a core wire having a thin coating of an arc stabilizing material thereon, the quantity of said coating being maintained within precise limits, the said apparatus comprising in combination a processing unit including means for depositing said coating on said wire and means for advancing said wire through said unit, said depositing means including means for directing an air blast substantially parallel to the roughened and coated wire into which the coating has been kneaded to remove excess coating from said wire, said air blast directing means including a venturi tube having an elongated constricted opening therein and said advancing means moving said wire with its longitudinal axes substantially parallel to the wall of said opening.

8. Apparatus for producing a consumable electrode for welding in an atmosphere of a non-reactive shielding gas, said electrode consisting of a core wire derived from a spool of said wire, said electrode having a thin coating of an arc stabilizing material thereon, the quantity of said coating being maintained within precise limits, the said apparatus comprising in combination a processing unit through which said wire is fed from said spool and including wire roughening means, coating depositing means, coating kneading means and means for removing excess coating and means for advancing said wire through said unit, the said apparatus being characterized by roughening means including a chamber, a plurality of sand-blast nozzles in said chamber with their opening displaced transversely about said wire and longitudinally along said wire and means for projecting abrasive material through said nozzles the longitudinal and transverse spacing of said openings being so related to the normal snaking of said wire that the wire is uniformly blasted, said apparatus being further characterized by excess coating removing means including means for directing an air blast substantially parallel to the roughened and coated wire into which the coating has been kneaded.

9. Apparatus for producing a consumable electrode for welding in an atmosphere of a non-reactive shielding gas, said electrode consisting of a core wire having a thin coating of an arc stabilizing material thereon, the quantity of said coating being maintained within precise limits, the said apparatus comprising in combination a processing unit including wire roughening means, coating depositing means, coating kneading means and means for removing excess coating and means for advancing said wire through said unit, the said apparatus being characterized by excess coating removing means including means for directing an air blast substantially parallel to the roughened and coated wire into which the coating has been kneaded.

10. Apparatus for roughening a wire played from a spool comprising means for feeding said wire from said spool through a chamber, a plurality of sand-blast nozzles in said chamber with their opening displaced transversely about said wire and longitudinally along said wire and means for projecting abrasive material through said nozzles, said apparatus being characterized by the fact that the longitudinal and transverse spacing of said openings is so related to the normal snaking of said wire that the wire is uniformly blasted.

References Cited in the file of this patent
UNITED STATES PATENTS

| | | |
|---|---|---|
| 172,894 | Smith | Feb. 1, 1876 |
| 1,333,586 | Churchward | Mar. 9, 1920 |
| 1,400,585 | Washburn | Dec. 20, 1921 |
| 1,583,844 | Kochendorfer | May 11, 1926 |
| 1,727,027 | Dreisbach | Sept. 3, 1929 |
| 1,774,703 | Dreisbach | Sept. 2, 1930 |
| 1,899,449 | Wallsten | Feb. 28, 1933 |
| 1,907,034 | Austin | May 2, 1933 |
| 1,910,497 | Peik | May 23, 1933 |
| 1,954,009 | Kotchi | Apr. 10, 1934 |
| 2,085,431 | Johnston | July 29, 1937 |
| 2,407,337 | Kolter | Sept. 10, 1946 |
| 2,676,564 | Gray | Apr. 27, 1954 |
| 2,694,763 | Muller | Nov. 16, 1954 |
| 2,697,770 | Carpenter | Dec. 21, 1954 |